United States Patent [19]
Bakoledis

[11] 3,942,255
[45] Mar. 9, 1976

[54] CHAIN SAW FILING GUIDE

[76] Inventor: Andrew G. Bakoledis, 12 Reservoir Road, Clinton, Conn. 06413

[22] Filed: Apr. 1, 1974

[21] Appl. No.: 456,477

[52] U.S. Cl. .................................. 33/202; 76/36
[51] Int. Cl.² .................... G01B 5/20; B23D 63/10
[58] Field of Search ......................... 33/202; 76/36

[56] References Cited
UNITED STATES PATENTS

| | | | |
|---|---|---|---|
| 433,465 | 8/1890 | Harman | 33/202 |
| 2,506,565 | 5/1950 | Blish | 33/202 |
| 3,060,768 | 10/1962 | Tremblay | 76/36 |
| 3,091,136 | 5/1963 | Maier | 76/36 |
| 3,438,286 | 4/1969 | Silvon | 33/202 X |

Primary Examiner—Richard E. Aegerter
Assistant Examiner—Charles E. Phillips
Attorney, Agent, or Firm—DeLio and Montgomery

[57] ABSTRACT

A filing guide for a chain saw which defines a longitudinal slot therethrough for the chain and at least one transverse slot is defined through the guide and channel for a file to be used on the teeth. Legs of the guide defining the chain channel are unequal in length so that pressure exerted by the thumb or fingers will clamp the guide laterally to the saw bar while downward hand pressure on the teeth hold the teeth firmly in the bar guide.

4 Claims, 5 Drawing Figures

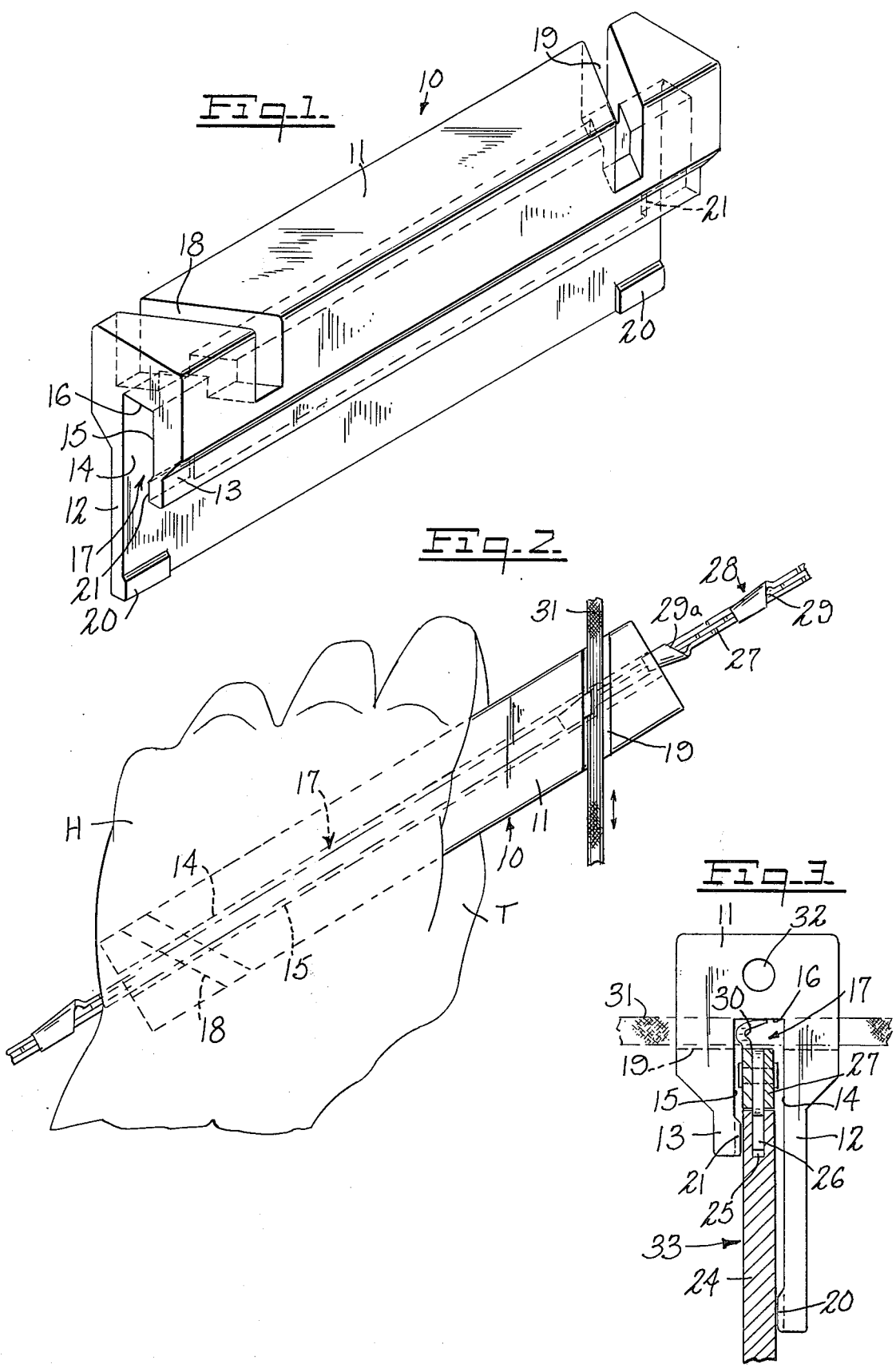

CHAIN SAW FILING GUIDE

This invention relates to chain saw filing guides.

Chain saws include chain carrying cutting elements which guidably move around a bar. The cutting elements or teeth periodically need resharpening. Such teeth generally have cutting surfaces that reside in substantially perpendicular planes.

The cutter teeth have a first portion extending outwardly from the bar and second portion directed laterally with respect to the first portion. Outwardly extending and laterally directed cutting edges are defined on the first and second portions. Alternate cutting elements have alternately angled lateral cutting edges. A round file is used to resharpen the cutting edges. Such file must be positioned accurately to avoid destruction of the first portion cutting edge, and must be further positioned to be inclined accurately at a correct transverse cycle to the plane of the bar to insure that the lateral cutting edge is correctly transversed with the file.

The cutter elements which form links in the chain are pivotally connected therein and as a result have some play. Additionally, some clearance exists between the bar track and the cutting element guide. This permits movement of the teeth as they are filed, if the teeth are not otherwise restrained.

Many filing guides have heretofore been proposed which are placed on the teeth or clamped to the bar of the saw and which include a transverse slot which exposes the cutting edges of the teeth to a sharpening file. A problem inherent in the various known devices is stability of such guides on the saw. Such guides must have a channel which is sufficient to clear and receive the width of the cutting teeth. However, the known guides do not have the facility for clamping and holding the teeth in a fixed position without wobble with respect to the bar and the guide.

Accordingly, the present invention provides a new and improved saw filing guide which may be placed over the bar, rest on the teeth to be filed and further be easily clamped with hand pressure to the bar and prevent any wobbling of the teeth as they are filed.

Briefly stated, the invention in one form thereof comprises a member having a passage extending longitudinally thereof and opened at the bottom thereof to define a generally U-shaped cross-section. One of the legs of the U is shorter than the other. Transverse filing guide slots are defined through the member and the channel to expose the edge of the teeth to be sharpened. Lug or abutment members are provided on the inside walls of the legs adapted to contact the bar when the guide is positioned. The shorter leg permits the guide to be on the bar with minimal clearance and further permits the use of the thumb or the fingers to clamp the member to the bar while exerting a downward holding force on the teeth.

An object of this invention is to provide a new and improved chain saw sharpening guide.

Another object of this invention is to provide a new and improved chain saw guide which may be positioned over the cutting teeth and bar and held rigidly with respect thereto.

A further object of this invention is to provide a device of the type described having leg portions which straddle the bar with minimal clearance to facilitate rigidly holding the guide and teeth with respect to the bar.

The features of the invention which are believed to be novel are particularly pointed out and distinctly claimed in the concluding portion of this specification. The invention, however, both as to its operation and organization, together with further objects and advantages thereof, may best be appreciated by reference to the following detailed description taken in conjunction with the drawings, wherein:

FIG. 1 is a perspective view of a device embodying the invention;

FIG. 2 is a top plan view of the device of FIG. 1 showing the manner in which it is applied to a chain saw;

FIG. 3 is a view of the guide of FIG. 2 seen from the right end thereof;

Figure 4:
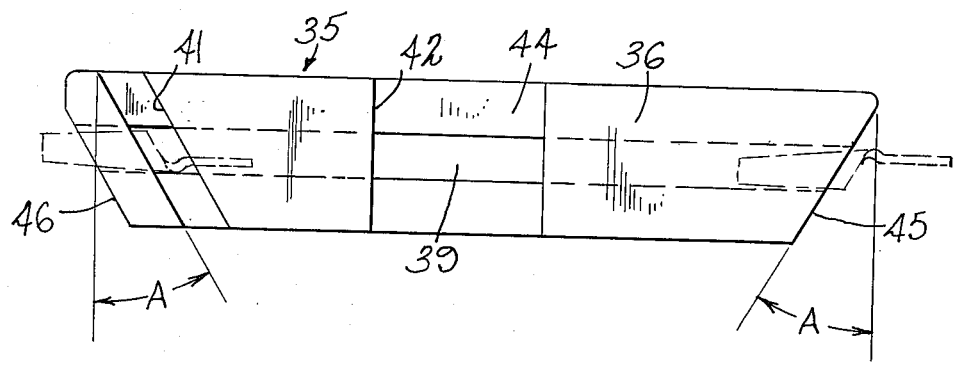
FIG. 4 is a plan view of another guide embodying the invention.

A device 10 embodying the invention comprises a unitary body member which may be of metal or a relatively hard plastic, such as polyurethane, and includes a top or bridging portion 11 having legs 12 and 13 extending essentially perpendicular thereto. The legs 12 and 13 have spaced apart essentially parallel inside walls 14 and 15, respectively, which together with lower surface 16 of bridging portion 11 define a longitudinal channel 17 through device 10. Defined in bridging portion 11 transverse to channel 17 are slots 18 and 19 which extend below (as shown in FIGS. 1 and 3) surface 16. A plurality of lugs 20 and 21 integrally extend from the inner walls 14 and 15, respectively. As shown in FIG. 3 the dimensional clearance between the lugs 20 and 21 is only a slight bit more than the width of the saw bar 24 and may be less than the lateral dimension defined by the lateral extremities of successive teeth. The saw bar 24 may be formed in one or two pieces and provides a track 25 through which the guide portions 26 of chain 27 move about the bar in a well known manner.

Cutting elements 28 comprise a tooth having a laterally angled cutting edge 29, shown in a horizontal plane in FIG. 2 with a side edge 30 (FIG. 3). A round file 31 is inserted under the edge 29 and moves in a reciprocating manner in one of slots 18 or 19, as indicated by the arrows in FIG. 2, to effect sharpening of the tooth edges. The slots 18 and 19 may be angularly defined in accordance with the cutting edge angles of different saws.

The leg 13 is sufficiently long as measured from surface 16 to extend partially over bar 24 and enable contact therewith, but short enough to allow either the thumb or fingers of the hand to engage the bar therebelow while the other of the thumb or fingers engage the leg 12.

In operation, the guide 10 is positioned so that the chain is at the opening defined between the end of leg 13 and wall 14 and slipped over the bar 24 and chain 27 with a rotative or turning motion of the hand to the position shown in FIG. 3. The clearance between the lugs 20 and 21 is usually not sufficient for the device to be applied vertically to the bar and chain. When in the position shown in FIG. 3 the guide is grasped with the hand H as shown in FIG. 2 and downward pressure is applied thereto so that the surface 16 of member 10 rests on the top of teeth 28. Simultaneously therewith lateral pressure is applied to member 10 by applying the thumb T to portion 33 of the bar 24 below leg 13 while pulling with the fingers on leg 12. In this orientation lugs 20 compressively engage bar 24 and the two components of pressure applied to the guide firmly clamp the guide 10 to the bar and rigidly hold the cutting elements 28 in position for sharpening with the file 31. As a tooth is filed, a portion thereof is engaged by surface 16.

As each tooth is sharpened, the chain is moved around the bar in channel 17, or alternatively, the guide may be moved along the bar.

The oppositely directed angular filing slots 18 and 19 are provided for the oppositely angled tooth cutting edges 29 and 29a. The slots are defined at predetermined angles to channel 17 dependent on the type of saw with which the guide is used. However, the edges of the slots are spaced apart to give clearance to the file. The angles of the slots act as a sight guide only, and the file preferably does not contact the walls defining the slots.

With this arrangement it will be seen that the guide bar and saw teeth may be firmly held so that there will be no movement of the teeth during the sharpening operation. The clearance between the lugs 20 and 21 and the bar need only be on the order of about 0.040 inch.

A channel or cylindrical passage 32 may be provided longitudinally through bridging portion 11 to store the file.

Figure 5:
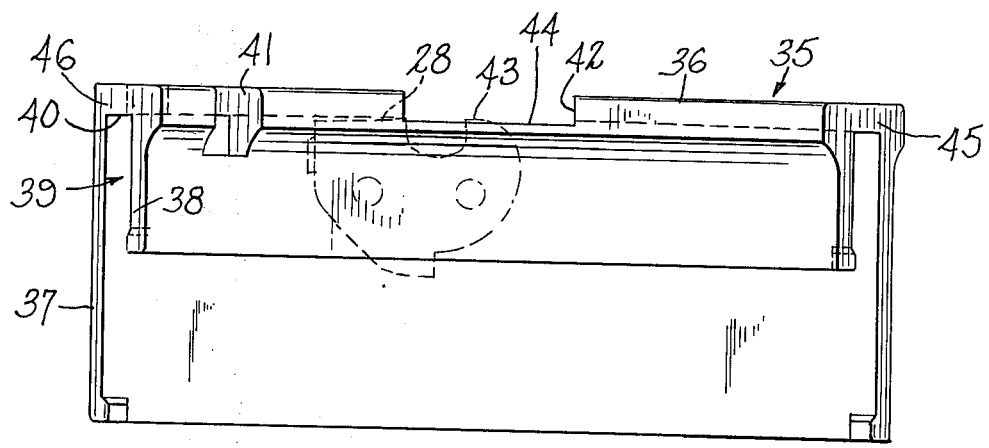
FIG. 5 is a side elevation of the guide of FIG. 4.

A further embodiment of the invention which utilizes less material is shown in FIGS. 4 and 5. This guide 35 comprises a top bridging portion 36 having essentially perpendicular leg members 37 and 38 extending therefrom and defining a channel 39 together with surface 40. Only one transverse lateral slot 41 is defined transversely through the body below surface 40 defining channel 39. The other end of the guide is terminated on an angle A equal but opposite to the angle A formed by slot 41. The angle of the end surfaces 45 of bridging portion 36 and legs 37 and 38 thus defines the guide filing angle. The construction is otherwise similar to that previously disclosed in the provision of the bar contact lugs on the interior surfaces of arms 37 and 38.

A further recess 42 is defined in bridging portion 36 in communication with channel 39 so that the raker or depth gauge 43 of a tooth 28 may be filed where necessary. The recess 42 has an upper surface 44 which may determine the height to which the raker 43 should extend and any portion thereof extending above surface 44 may be filed down so that it does not extend above the cutting edge 29.

The end 46 of guide 30 is shown as being also formed at the angle A with respect to a plane perpendicular to channel 39. However, this edge may be formed perpendicular to channel 39.

In FIG. 5, the channel 39 is shown as having a slight concavity throughout its length. This is to accommodate the slight convex curvature of the edges of the saw bar between its end radii. The curvature of the channel permits the channel wall of the bridging member to contact more than two cutting elements at one time, and further lend rigidity to the combination of the bar cutting elements and filing guide when the guide is operatively positioned.

In both embodiments of the invention the bridging portion of the guide rests on teeth to be sharpened. The cutting edges are exposed in the transverse slots or at the angled end 45. Either the thumb or the fingers may be positioned below the end of the shorter leg to draw the guide against the saw bar.

The wall of the bridging member forming the bottom of the channels may, if desired, be formed with a shaped cross-section to conform to the shape of the cutter teeth for a particular saw.

The bar engaging projections 20, 21 may be provided in any number, or alternatively, one continuous projection may be provided along the lower edge of each of the legs.

A guide embodying the invention may be of any convenient size. In the embodiment of FIGS. 4 and 5, the guide member has been constructed about 5½ inches long with legs 1 inch and about 2¼ inches long. The channel had a width of about 5/16 inch and the projections defined a dimension of 0.156 inch therebetween. These dimensions may be changed to accommodate various saw sizes. The guide may have either from zero to two filing slots. While two embodiments having different features have been disclosed, the uncommon features of one, such as the longitudinally concave channel, depth gauge recess, file holding passage, number of filing slots, and angled ends may be incorporated singly or in various combinations in any embodiment of the invention.

A further advantage is provided when the guide is molded or cast in a plastic material. Some flexibility will exist in the legs, and facilitate clamping the guide to the bar.

It may thus be seen that the objects of the invention set forth as well as those made apparent from the preceding description are efficiently attained. While preferred embodiments of the invention have been set forth for purposes of disclosure, further embodiments of the invention as well as modifications to the disclosed embodiments which do not depart from the spirit and scope of the invention may occur to others skilled in the art. Accordingly, the appended claims are intended to cover all embodiments and modifications of the invention which do not depart from the spirit and scope of the invention.

What is claimed is:

1. For use in combination with a chain saw which includes a bar with a chain movable about the periphery thereof and carrying successive cutting elements thereon, said cutting elements have an upper surface terminating in an angled cutting edge and a side edge, and a lateral dimension defined by the lateral extremities of said successive teeth which is greater than the thickness of said bar: an elongated one piece cutting element filing guide member of generally U-shaped cross-section having spaced apart legs having spaced apart essentially parallel inside walls and a bridging portion between said legs defining a continuous channel through said member, the bridging portion providing a surface to contact the upper surfaces of cutting elements, at least one passage defined through said bridging portion and said legs communicating with said channel whereby the edges of a cutting element can be exposed through said passage when said surface of said bridging portion rests on the upper surface of the cutting element whose edges are exposed, one of said legs being shorter than the other, said legs being so dimensioned such that said member may be positioned on a chain saw with the bar thereof between said legs and said bridging member on cutting elements with the longer of said legs held against the bar with one hand while the bar is engaged on the opposite side by the same hand below said shorter leg, further including projections integral with said legs extending from said inside walls of said legs and extending toward said channel and being adjacent the free ends thereof, wherein the distance between said integral projections measured essentially along a line perpendicular to said inside walls is less than the distance across the lateral exremities of two successive cutting elements on said chain.

2. The guide of claim 1 wherein the surface of said bridging portion defining said channel is concave along a direction normal to said cross-section.

3. The guide of claim 1 wherein at least one end of said member is formed with a surface defining a filing guide angle and is in a plane transverse to said channel.

4. The guide of claim 1 wherein a passage is defined longitudinally through said bridging member adapted to hold a round file.

* * * * *